United States Patent [19]

Bednarz

[11] Patent Number: 4,839,912
[45] Date of Patent: Jun. 13, 1989

[54] SWITCHING CIRCUIT ARRANGEMENT FOR MONITORING A BINARY SIGNAL

[75] Inventor: Jürgen Bednarz, Munich, Fed. Rep. of Germany

[73] Assignee: U.S. Philips Corporation, New York, N.Y.

[21] Appl. No.: 154,567

[22] Filed: Feb. 10, 1988

[30] Foreign Application Priority Data

Feb. 17, 1987 [DE] Fed. Rep. of Germany ....... 3704980

[51] Int. Cl.$^4$ .................... H03K 21/40; H03K 23/50; H03K 27/00
[52] U.S. Cl. .................................. 377/119; 377/107; 377/28; 377/49; 307/272.1
[58] Field of Search ............... 328/120, 112, 109, 164, 328/110, 114, 132; 307/247 R, 480, 234, 518, 517, 272.1; 377/119, 107, 28, 49

[56] References Cited

U.S. PATENT DOCUMENTS

| 2,984,789 | 5/1981 | O'Brien | 328/120 |
| 3,961,203 | 6/1976 | Hutch | 328/120 |
| 4,399,412 | 8/1983 | Rinaldi | 307/234 |
| 4,446,437 | 5/1984 | Rinaldi | 328/120 |

FOREIGN PATENT DOCUMENTS 0191421 8/1986 European Pat. Off. .

Primary Examiner—Stanley D. Miller
Assistant Examiner—Nancy Thai
Attorney, Agent, or Firm—Thomas A. Briody; Jack E. Haken; Jack D. Slobod

[57] ABSTRACT

A circuit arrangement for monitoring a binary signal having at least one level shift within a characteristic waiting time, such circuit including two flip-flops which receive control pulses at intervals at least as long as the characteristic waiting time. In order to enable the two flip-flops to employ the same clock pulses, a gate circuit is assigned to each of them, the output of which is connected to the data input of the assigned flip-flop. If a control pulse is present, the first gate circuit ensures that the first flip-flop can switch to its set state, while the second gate ensures that the state of the second flip-flop is switched to the inverse of the state of the first flip-flop. If a control pulse is not present, the first flip-flop can only be switched to its reset state when the binary signal to be monitored has the binary value 1, while the second flip-flop cannot switch from its existing state.

5 Claims, 1 Drawing Sheet

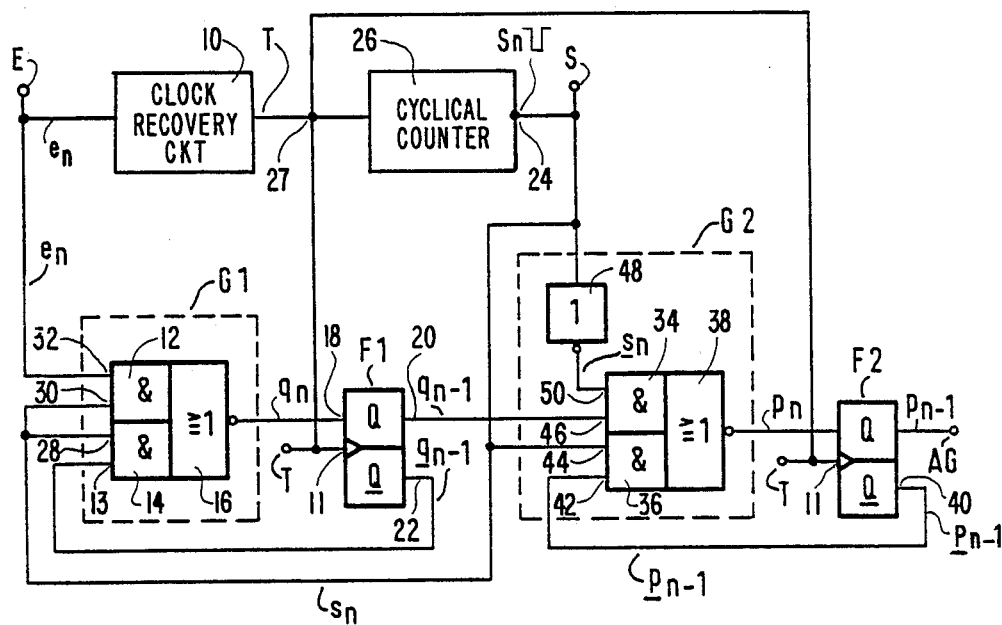

4,839,912

SWITCHING CIRCUIT ARRANGEMENT FOR MONITORING A BINARY SIGNAL

BACKGROUND OF THE INVENTION

1. Field of the Invention

The invention relates to a circuit arrangement for monitoring a binary signal which in normal operation exhibits at least one level shift within a characteristic waiting time and which has two flip-flops that receive control pulses from a control unit, the interval between control pulses being at least as long as the characteristic waiting time.

2. Description of the Related Art

A circuit arrangement with the features mentioned is known from European Patent EP No. 0 191 421. In that known arrangement, the control unit is a frequency divider which divides the bit clock pulse of the binary signal to be monitored and connects its output to the reset input of a first D flip-flop. The division ratio of the divider is selected so that the interval between two reset pulses for the first D flip-flop matches that of the above-mentioned characteristic waiting time. The signal to be monitored is fed to the clock input of the first D flip-flop. With a second D flip-flop, which is clocked with the output signal of the divider, i.e. with the reset pulses for the first D flip-flop, the state of the first D flip-flop is queried and accepted by the second D flip-flop. It can then be seen from the state of the second D flip-flop whether an edge shift occurred or not during the characteristic waiting time. If no edge shift occurred, this is taken as a criterion indicating the presence of a defect.

The known arrangement can be integrated; however an arrangement of this kind is seldom used on its own as an integrated component, rather it is usually only a small part of the functional units integrated on a chip.

With chips with a high integration density, it is very important to have simple, yet reliable test methods with which the proper functioning of all the units integrated on a chip can be checked. A prerequisite for a method of this kind, which we will not discuss in more detail here, is, for example, to clock all flip-flops with the same clock pulse. In the known circuit arrangement, the first flip-flop is clocked by edges of the binary signal to be monitored and the second by edges of the clock pulses. Therefore a chip having the known arrangement as a component part would have to be tested using a special procedure.

SUMMARY OF THE INVENTION

The object of the invention is to provide a circuit arrangement of the type described in which the flip-flops are clocked with the same clock pulse.

The object is achieved in that each flip-flop is clocked with a clock pulse, the frequency of which is at least as high as that of the bit clock pulse of the binary signal to be monitored, in that the data input of each flip-flop is connected to the output of a gate circuit assigned to it and the inputs of each gate circuit are connected to the outputs of the flip-flops, the control unit and the line for the binary signal to be monitored in such a manner that the following apply:

(a) If a control pulse is present, then the output variable of the first gate circuit assumes a first predetermined binary value, while the output variable of the second gate circuit is defined by the binary value stored in the first flip-flop before the control pulse appeared.

(b) If no control pulse is present, then the output variable of the first gate circuit assumes the binary value stored in the first flip-flop if a second predetermined binary value appears in the binary signal to be monitored; and it assumes the inverse of the first predetermined binary value if the inverse of the second predetermined binary value appears in the binary signal to be monitored, while the output variable of the second gate circuit assumes the binary value stored in the second flip-flop.

The logical function of the gate circuits states in achieving the object is clearly defined by the specified features (a) and (b), when the conjunctions (and; if ... then; if) and the equivalent values are read as logical operations (conjunction, subjunction, equivalence). All circuit features of the gate circuits which determine the function can then also be written down in formulas (cf., for example, formula (1) and (2) below).

BRIEF DESCRIPTION OF THE DRAWING

An embodiment of the invention will be explained in more detail with reference to the sole accompanying FIGURE. The FIGURE illustrates a monitoring circuit with the circuit features according to the invention.

DESCRIPTION OF THE PREFERRED EMBODIMENTS

In the FIGURE a binary signal $e_n$ to be monitored is present at a terminal E. The binary signal $e_n$ is an isochronous signal. The association clock pulse T, which is obtained by a clock recovery circuit 10 from the signal $e_n$, is present at the clock pulse inputs 11 of two D flip-flops F1 and F2. The output signal $q_n$ of the first gate circuit G1, which consists of two AND-gates 12 and 14, whose output signals are combined by a NOR-gate 16, is fed to the D input of the associated first D flip-flop F1. The $\overline{Q}$ output 22 with the signal $\overline{q_{n-1}}$ is fed to one input 13 of the lower AND-gate 14 of the gate circuit G1, while the control pulses $S_n$, which are present at a terminal S, and which come from the carry output 24 of a control unit counter 26 (also receiving clock pulse T at its clock input 27), are fed to the second input 28 of gate 14 and an input 30 of the upper AND-gate 12. The signal $e_n$ to be monitored is present at the second input 32 of the upper AND-gate of the first gate circuit G1.

A second gate circuit G2 similarly contains two AND-gates 34 and 36, whose output signals are combined by a NOR-gate 38. The second D flip-flop F2 is connected to the second gate circuit G2 in the same manner as the D flip-flop F1 is connected to the gate circuit G1. The output signal of the second gate circuit is denoted by $p_n$ and the signals at the Q and $\overline{Q}$ output of the second D flip-flop F2 by $p_{n-1}$ and $\overline{p_{n-1}}$ respectively with the Q output 40 connected to the first input 42 of lower AND-gate 36. The second input 44 of the lower AND-gate 36 of the gate circuit G2 is similarly connected to the carry output 24 of the previously mentioned counter 26, while the upper AND-gate receives the signal $q_{n-1}$ from the Q output of the first D flip-flop F1 at the input 46 of upper AND-gate 34 with the carry signal $s_n$ being inverted by an inverter 48 and the resultant signal $\overline{s_n}$ being fed to the other input 50 of upper AND-gate 34.

The signals symbolized in the FIGURE represent variables for the binary values of these signals at a time $t_n = nT_o$; for this reason they have the index n. $T_o$ is the cycle period of the clock pulse T. The inversion of the variables is here symbolised with a line under the variables themselves. The storage effect of the D flip-flops F1 and F2 is expressed by the fact that at time $t_n$ the binary values for the preceding time $t_{n-1}$ are present at their output.

The double use of two AND-gates with subsequent NOR connection—a so-called "standard cell"—has, when manufacturing the total circuit of an integrated circuit, the advantage that only such pre-fabricated standard cells can be used. Other combinations of gates for the gate circuits G1 and G2 are also possible without the effect of the total circuit being changed, as will be demonstrated later.

In the further description we will employ a suggestion of I. Tammelo and G. Moens regarding typewriter-oriented notation of logical operations: binary or logical variables are denoted only by lower case letters (with an index if necessary); logical combinations of two variables are denoted by upper case letters which are placed before the two variables to be connected (Polish notation). The negation of a combination is indicated here by a line under the upper case letter and the negation of a variable by a line under the lower case letter. Thus the AND-combination of the variables $e_n$ and $s_n$ is represented by $Ke_ns_n$ (K denoting conjunction). The upper case letter A (A as in adjunction) is reserved for an OR combination. This notation has the advantage that even extensive multiple combinations are clear and easily comprehensible without using brackets. Thus, for example, the logical function of the circuit according to the FIGURE is described by the validity of the following two equations:

$$q_n = \underline{A}Ke_ns_nKs_nq_{n-1} \quad (1)$$

$$p_n = \underline{A}Kq_{n-1}\underline{s}_nKs_n\underline{p}_{n-1} \quad (2)$$

The equations (the equivalence is represented here by the = sign) define the values of the variables $q_n$ and $p_n$ by the values of the variables on the right. The number of gates required for this can be seen from the number of upper case letters. Due to the logical equivalence of $AKe_ns_nKs_nq_{n-1}$ and $Ks_nAe_nq_{n-1}$ (distributive law), the last conjunction stated (AND-combination) can be inserted in equation (1). A variant of the circuit G1 with an equal function is then obtained with only three gates. Similarly a circuit variant can be obtained for the gate circuit G2 when the equivalence of $\underline{A}Kq_{n-1}\underline{s}_nKs_n\underline{p}_{n-1}$ and $AKq_{n-1}\underline{s}_nKs_np_{n-1}$ is taken into account; the variables $q_{n-1}$ and $p_{n-1}$ are available anyway due to the flip-flops F1 and F2 and do not need to be obtained by negation from the variables $q_{n-1}$ and $p_{n-1}$. By taking into account further equivalences or by using D flip-flops clocked with negative clock edges, or both, further circuit variants having an equal function are obtained, all of which belong to the subject of the invention.

In order to explain the way the circuit functions according to the FIGURE, it is first established which of the alternative control pulse situations described above in the description of the object of the invention is selected. The carry signal $s_n$ takes the value zero at regular intervals and has the value 1 for all times in between. Consequently, $s_n$=zero means that a control pulse is present. As can be seen from equation (1) and also from the FIGURE, $q_n=1$ then; the first predetermined binary value therefore has the value 1. It is accepted at the Q output of the D flip-flop F1 upon the next active pulse edge of the clock pulse T—it lies approximately at the middle of the bit. The time between two zero values of $s_n$ is selected to be so large that in normal operation the binary signal $e_n$ does not continuously take the second predetermined binary value, namely the value zero, during this time.

For $s_n=0$ or $s_n=1$ respectively, it follows from equation (2) that $p_n=q_{n-1}$, i.e. the variable $p_n$ takes the inverted value which was stored in flip-flop F1 before the reset pulse occurred. This value is accepted at the Q output of the D flip-flop F2 upon the next active pulse edge and is present at an output terminal AG.

If $q_{n-1}=1$ or $\underline{q}_{n-1}=0$, (set switched state of the D flip-flop F1) and $s_n=1$, then $q_n=e_n$, as equation (1) shows. This means that only $e_n=1$—i.e. a 1 in the binary signal to be monitored—can change the switched state of the D flip-flop F1. If the flip-flop F1 is reset, i.e. $q_{n-1}=0$ or $\underline{q}_{n-1}=1$ and still $s_n=1$, $q_n=0$ remains according to equation (1), to be precise independently of the values of $e_n$. Once the D flip-flop F1 has been reset by a 1 in the binary signal to be monitored, it can therefore only be brought into the set state again by a control pulse $s_n=0$.

If, for example, the D flip-flop F1 was reset due to a 1 in the binary signal, then at the next control pulse, the state of the D flip-flop F2 is matched again to the inverted state of the D flip-flop F1, before the flip-flop F1 is set again.

It is still to be shown that where there are no control pulses present, i.e. where $s_n=1$, the state of the D flip-flop F2 cannot change. If $s_n=1$ is inserted in equation (2), $p_n=p_{n-1}$ is obtained. The flip-flop F2 therefore accepts its stored binary value again at its Q output.

If no binary signal is present—in the present example that means $e_n=0$ for all n—then a continuous zero is present at output AG.

What is claimed is:
1. A circuit arrangement for monitoring level shifts in a binary signal ($e_n$) having an associated bit clock rate and exhibiting at least one level shift within a characteristic waiting period, said circuit arrangement comprising:
   clock means for generating a sequence of clock pulses (T) at a frequency at least as high as the bit clock rate;
   control means for generating a sequence of control pulses ($s_n$) having a period approximately equal to said characteristic waiting time;
   first and second flip-flops (F1, F2) each having an output, a data input and a clock input, said clock means feeding the clock input of each flip-flop;
   first and second gate circuits (G1, G2) each having an output and at least three inputs, with a first input of each gate circuit being coupled to the output of said control means;
   the second inputs of said first and second gate circuits (G1, G2) being respectively coupled to the outputs of said first and second flip-flops (F1, F2);
   the third input of said first gate circuit (G1) comprising means for receiving said binary signal ($e_n$);
   the outputs of said first and second gate circuits (G1, G2) being respectively coupled to the data inputs of said first and second flip-flops (F1, F2);
   the output of said first flip-flop (F1) being coupled to the third input of said second gate circuit (G2);

said first and second gate circuits (G1, G2) comprising means for obeying the following rules:

(a) if a control pulse is present, the output variable ($q_n$) of the first gate circuit (G1) assumes a first predetermined binary value and the output variable ($p_n$) of the second gate circuit (G2) is defined solely by the binary value stored in the first flip-flop (F1); but (b) if a control pulse is not present, the output variable ($p_n$) of the second gate circuit (G2) is defined solely by the binary value stored in the second flip-flop (F2) and if said binary signal ($e_n$) assumes a second predetermined binary value, the output variable ($q_n$) of the first gate circuit is defined solely by the binary value stored in the first flip-flop (F1), but if said binary signal assumes the inverse of said second predetermined binary value, the output variable ($q_n$) of the first gate circuit (G1) assumes the inverse of the first predetermined binary value.

2. The circuit arrangement of claim 1 wherein said control means comprises a cyclical counter having a clock input fed by said clock means, said control pulses ($s_n$) being carry pulses produced by the counter.

3. The circuit arrangement of claim 1 wherein each said gate circuit (G1, G2) comprises two AND gates and a third gate means, the outputs of said two AND gates being inputs to said third gate means.

4. The circuit arrangement of claim 2 wherein each said gate circuit (G1, G2) comprises two AND gates and a third gate means, the two outputs of said two AND gates being inputs to said third gate means.

5. The circuit arrangement of claim 3 wherein said first input of each gate circuit comprises an input to each said AND gate coupled from the output of said control means; said coupling being such that both AND gates of said first gate circuit and one AND gate of said second gate circuit receive as an input from the said control means, the inverse of the input received by the other AND gate of the second gate circuit.

* * * * *